US011546850B2

(12) United States Patent
Wilhelmsson et al.

(10) Patent No.: US 11,546,850 B2
(45) Date of Patent: Jan. 3, 2023

(54) WAKE-UP SIGNAL MANAGEMENT

(71) Applicant: Telefonaktiebolaget LM Ericsson (publ), Stockholm (SE)

(72) Inventors: Leif Wilhelmsson, Lund (SE); Miguel Lopez, Solna (SE); Sven Mattisson, Lomma (SE); Dennis Sundman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/625,638

(22) PCT Filed: May 18, 2018

(86) PCT No.: PCT/EP2018/063058
§ 371 (c)(1),
(2) Date: Dec. 20, 2019

(87) PCT Pub. No.: WO2019/001845
PCT Pub. Date: Jan. 3, 2019

(65) Prior Publication Data
US 2020/0163018 A1    May 21, 2020

Related U.S. Application Data

(60) Provisional application No. 62/524,940, filed on Jun. 26, 2017.

(51) Int. Cl.
*H04W 52/02* (2009.01)

(52) U.S. Cl.
CPC ... *H04W 52/0229* (2013.01); *H04W 52/0206* (2013.01); *H04W 52/0238* (2013.01); *H04W 52/0245* (2013.01); *H04W 52/0274* (2013.01)

(58) Field of Classification Search
CPC ......... H04W 52/0245; H04W 52/0229; H04W 52/0206; H04W 52/0238; H04W 52/028; H04W 52/0274
See application file for complete search history.

(56) References Cited

U.S. PATENT DOCUMENTS

| 4,955,038 A | 9/1990 | Lee et al. |
| 8,386,049 B2 | 2/2013 | Persson et al. |

(Continued)

FOREIGN PATENT DOCUMENTS

| CN | 105101304 A | 11/2015 |
| CN | 105594245 B | 9/2020 |

(Continued)

OTHER PUBLICATIONS

Caballe et al., "An Alternative to IEEE 802.11ba: Wake-Up Radio With Legacy IEEE 802.11 Transmitters", 2019 (Year: 2019).*

(Continued)

*Primary Examiner* — Omer S Mian
(74) *Attorney, Agent, or Firm* — Murphy, Bilak & Homiller, PLLC

(57) ABSTRACT

The invention relates to a method for a wireless communication apparatus, and such an apparatus, configured to use a wake-up signal (WUS), transmitted for waking up a main receiver of a wireless communication device responsive to detection of the WUS by a wake-up receiver (WUR) of the wireless communication device. The method comprises controlling a bandwidth associated with the WUS based on a reception condition metric for the WUR. Embodiments may comprise determining the reception condition metric for the WUR by correlating a received signal comprising the WUS with a WUS reference signal to provide an extreme correlation value, and determining the reception condition metric for the WUR based on the extreme correlation value. In some embodiments, controlling the bandwidth associated (Continued)

with the WUS based on the reception condition metric may comprise controlling a WUS bandwidth based on the reception condition metric. The wireless communication apparatus may be the wireless communication device or the access point.

16 Claims, 5 Drawing Sheets

(56) References Cited

U.S. PATENT DOCUMENTS

| | | | |
|---|---|---|---|
| 9,408,150 | B2 | 8/2016 | Bradley et al. |
| 9,485,733 | B1 | 11/2016 | Park et al. |
| 2007/0264963 | A1 | 11/2007 | Srinivasan et al. |
| 2008/0174446 | A1 | 7/2008 | Ghabra et al. |
| 2008/0220792 | A1 | 9/2008 | Fischer |
| 2012/0120859 | A1 | 5/2012 | Stephens et al. |
| 2014/0112229 | A1* | 4/2014 | Merlin .......... H04L 5/0055 370/311 |
| 2015/0188587 | A1 | 7/2015 | Imamura et al. |
| 2015/0334602 | A1 | 11/2015 | Hencinski |
| 2016/0007288 | A1 | 1/2016 | Samardzija et al. |
| 2016/0100294 | A1* | 4/2016 | Ruelke .......... H04W 72/048 455/509 |
| 2016/0226740 | A1 | 8/2016 | Van Oost et al. |
| 2016/0337973 | A1 | 11/2016 | Park et al. |
| 2016/0374021 | A1 | 12/2016 | Alpman et al. |
| 2019/0289475 | A1 | 9/2019 | Hedman et al. |
| 2020/0059345 | A1* | 2/2020 | Pelletier .......... H04L 1/1657 |
| 2020/0163018 | A1 | 5/2020 | Wilhelmsson et al. |
| 2020/0220641 | A1* | 7/2020 | Suh .......... H03M 1/127 |
| 2020/0267651 | A1 | 8/2020 | Wilhelmsson et al. |

FOREIGN PATENT DOCUMENTS

| | | |
|---|---|---|
| CO | 2019014873 A2 | 1/2020 |
| EP | 2464175 A2 | 6/2012 |
| EP | 2628340 A1 | 8/2013 |
| JP | 2014179786 A | 9/2014 |
| JP | 2015149640 A | 8/2015 |
| NO | 2007027032 A1 | 3/2007 |
| RU | 2498534 C1 | 11/2013 |
| WO | 2012049064 A1 | 4/2012 |

OTHER PUBLICATIONS

Park, Minyoung, et al., "Low-Power Wake-Up Receiver (LP-WUR) for 802.11", IEEE 802.11-15/1307r1, Nov. 10, 2015, pp. 1-18.

Shellhammer, Steve, et al., "Data Rates and Coding", IEEE May 2017 802.11-17/0670r0, May 7, 2017, pp. 1-17.

Shellhammer, Steve, et al., "Regulations and Noise Figure—Impact on SNR", IEEE 802.11-17/0365r0, Mar. 8, 2017, pp. 1-8.

Wilhelmsson, Leif, et al., "Concurrent transmission of data and a wake-up signal in 802.11ax", IEEE 302.11-17/0094r1, Jan. 15, 2017, pp. 1-11.

Wilhelmsson, Leif, "Simulated WUR Performance in Frequency Selective Channels", IEEE 802.11-17/0662r0, May 7, 2017, pp. 1-19.

Wilhelmsson, Leif, et al., "Variable signal bandwidth of the wake-up signal for enhanced WUR performance", IEEE 802.11-17/1017r2, Jul. 10, 2017, pp. 1-22.

Bdiri, et al., "An Ultra-Low Power Wake-up Receiver for Real-time Constrained Wireless Sensor Networks", AMA Conferences, 2015, 6 pages.

* cited by examiner (a)

(b)

(c)

WAKE-UP SIGNAL MANAGEMENT

TECHNICAL FIELD

The present disclosure relates generally to the field of wireless communication. More particularly, it relates to wake-up signals for waking up a main receiver of a wireless communication device.

BACKGROUND

A wake-up receiver (WUR; sometimes referred to as a wake-up radio) provides for significant reduction of the power consumption in wireless communication receivers. One aspect of the WUR concept is that the WUR can be based on a very relaxed architecture, since it only needs to be able to detect presence of a wake-up signal (WUS) and may not be used for reception of data or other control signaling than the WUS.

A commonly used modulation for the WUS (i.e., the signal sent to the WUR) is on-off keying (OOK). OOK is a binary modulation, where a logical one is represented by sending a signal (ON) and a logical zero is represented by not sending any signal (OFF), or vice versa.

Ongoing activities in the Institute of Electrical and Electronics Engineers (IEEE) 802.11 task group (TG) named IEEE 802.11ba aims at standardization of the physical (PHY) layer and the media access control (MAC) layer for a WUR that is to be used as a companion radio to the main IEEE 802.11 radio to significantly reduce the average power consumption by ensuring that the main radio can be in a low power mode more often.

A possibility for generation of the WUS is using an inverse fast Fourier transform (IFFT), since such a functional block is already available in many transmitters, for example Wi-Fi transmitters supporting e.g. IEEE 802.11a/g/n/ac. One example approach to generation of the WUS using OOK is to use 13 sub-carriers in the center of a frequency range of the IFFT, to populate them with a suitable signal to represent ON and to not transmit anything at all on these sub-carriers to represent OFF. In a typical example, the IFFT has 64 points and is operating at a sampling rate of 20 MHz. Just as for ordinary orthogonal frequency division multiplexing (OFDM), a cyclic prefix (CP) may be added after the IFFT operation in order to have the same duration and format as a normal OFDM symbol duration used in 802.11a/g/n/ac (and thus be able to spoof legacy stations by prepending a legacy preamble at the beginning of the WUS). In this way, legacy stations will be able to detect the transmission of a WUS and correctly defer access to the wireless medium. That is, legacy stations will be able to detect presence of a WUS although they will generally not be able to decode the information carried by the WUS.

Although the approach described above has many attractive features, it suffers from a relatively poor sensitivity, potentially making the WUS difficult to receive for a low power implementation of a WUR.

Therefore, there is a need for approaches that enable WUS reception under non-favorable reception conditions while also being power efficient.

As background prior art, the document US 2007/0264963 A1 can be mentioned. It relates to a method and system employing wideband signals for RF wakeup. A method of reducing an energy consumption of a wireless network is disclosed. The method includes periodically entering a sleep mode by a receiver node, broadcasting a signal simultaneously across a wide band frequency range, upon waking up from the sleep mode, listening by the receiver node to only a first narrow part of the wide band frequency range, the receiver node subsequently either returning to sleep if a signal strength of the broadcasted signal is less than a predefined signal strength threshold, or staying awake for an additional period of time if the signal strength of the broadcasted signal is greater than the predefined signal strength threshold. The idea is to reduce power by listening to a narrowband part of a wideband signal. In particular the receiver can select which part to use, and the transmitter does not need to know.

Another background document is US 2012/0120859 A1. It relates to techniques for wakeup signaling for a very low power WLAN device. A disclosed embodiment provides a method of wakeup signaling for a very low power wireless local area network device (WLAN) device, comprising transmitting by an access point operable in the WLAN of a wake-up signal that can be received using low-power techniques at a receiver associated with the device. The idea appears to be to use spare tones in 802.11 to transmit the WUS.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the disadvantages referred to herein, or other disadvantages.

According to a first aspect, this is achieved by a method for a wireless communication apparatus configured to use a wake-up signal (WUS), transmitted, e.g. by an access point, for waking up a main receiver of a wireless communication device responsive to detection of the WUS by a wake-up receiver (WUR) of the wireless communication device.

The method comprises controlling a bandwidth associated with the WUS based on a reception condition metric for the WUR.

The wireless communication apparatus may be the wireless communication device according to some embodiments.

The method may, according to some embodiments, further comprise determining the reception condition metric for the WUR by correlating a received signal comprising the WUS with a WUS reference signal to provide an extreme (e.g. maximum or minimum) correlation value, and determining the reception condition metric for the WUR based on the result of this correlation, e.g, by considering the extreme correlation value.

Determining the reception condition metric for the WUR based on the extreme correlation value may, in some embodiments, comprise comparing the extreme correlation value to a reception condition threshold value, determining the reception condition metric to have a first reception condition value when the extreme correlation value is higher than the reception condition threshold value and determining the reception condition metric to have a second reception condition value when the extreme correlation value is not higher than the reception condition threshold value.

The method may further comprise dynamically adapting the reception condition threshold value based on an immediately previous bandwidth associated with the WUS according to some embodiments.

In some embodiments, the method may further comprise comparing the extreme correlation value to a WUS detection threshold value which is lower than the reception condition threshold, and waking up the main receiver when the extreme correlation value is larger than the WUS detection threshold value.

The WUR may, according to some embodiments, comprise a channel selective filter for filtering of the WUS before detection. Then, controlling the bandwidth associated with the WUS based on the reception condition metric may comprise controlling a channel selective filter bandwidth based on the reception condition metric.

In some embodiments, controlling the bandwidth associated with the WUS based on the reception condition metric may comprise transmitting a signal which is based on the reception condition metric to the access point for controlling a WUS bandwidth. The signal which is based on the reception condition metric may be a WUS bandwidth request.

The wireless communication apparatus may be the access point according to some embodiments.

In some embodiments, controlling the bandwidth associated with the WUS based on the reception condition metric may comprise controlling a WUS bandwidth based on the reception condition metric.

The method may further comprise receiving a signal which is based on the reception condition metric from the wireless communication device according to some embodiments. The signal which is based on the reception condition metric may be a WUS bandwidth request.

According to some embodiments, receiving the WUS bandwidth request may comprise receiving two or more respective WUS bandwidth requests from two or more respective wireless communication devices targeted by the WUS. Then, controlling the WUS bandwidth may comprise selecting the widest bandwidth among the WUS bandwidth requests as the WUS bandwidth.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a wireless communication apparatus configured to use a wake-up signal (WUS), transmitted, e.g. by an access point, for waking up a main receiver of a wireless communication device responsive to detection of the WUS by a wake-up receiver (WUR) of the wireless communication device.

The arrangement comprises a controller configured to cause control of a bandwidth associated with the WUS based on a reception condition metric of the WUR.

A fourth aspect is a wireless communication device comprising the arrangement of the third aspect.

A fifth aspect is an access point comprising the arrangement of the third aspect.

In some embodiments, any of the above aspects may additionally have features identical with or corresponding to any of the various features as explained above for any of the other aspects.

An advantage of some embodiments is that WUS detection may be enabled in non-favorable reception conditions.

This advantage may, for example, be achieved by using a relatively large WUS bandwidth to enable an increased maximum allowable transmission power compared to if a relatively small WUS bandwidth were used. Since a maximum allowable transmission power is typically specified per frequency unit (e.g. per sub-carrier or per Hz), a larger bandwidth increases the maximum allowable transmission power. A higher transmission power, in turn, may increase the range for the WUS and, correspondingly, may increase a signal quality metric, e.g. signal-to-interference ratio (SIR), at a WUR receiving the WUS.

Alternatively or additionally, this advantage may, for example, be achieved by using a channel selection filter (CSF) bandwidth in the WUR that has substantially the same bandwidth as the WUS. A larger CSF bandwidth would typically increase the noise at the filter output and, thus, lower the signal quality metric. A smaller CSF bandwidth would exclude some of the received WUS power and, thus, lower the signal quality metric.

Another advantage of some embodiments is that WUS reception may be enabled with low power consumption.

This advantage may, for example, be achieved by using a channel selection filter (CSF) bandwidth in the WUR that is relatively small (typically smaller than the bandwidth of the WUS, or having the same bandwidth as the WUS). Using a small bandwidth of the CSF is typically more power efficient than using a large bandwidth of the CSF.

Yet an advantage of some embodiments is that a trade-off between enabling WUS detection in non-favorable reception conditions and having low power consumption in the WUR may be achieved by dynamically adapting the WUS bandwidth and/or the CSF bandwidth based on reception conditions. Typically, relatively wide bandwidth(s) may be used in non-favorable reception conditions to achieve robust WUS detection and relatively narrow bandwidth(s) may be used in favorable reception conditions to lower the WUR power consumption.

Some embodiments provide a flexible implementation of wake-up receivers and/or transmitters, which enables improved coverage without using more power than necessary. Alternatively or additionally, some embodiments provide a flexible implementation of wake-up receivers and/or transmitters, which enables reduced power consumption without sacrificing range.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
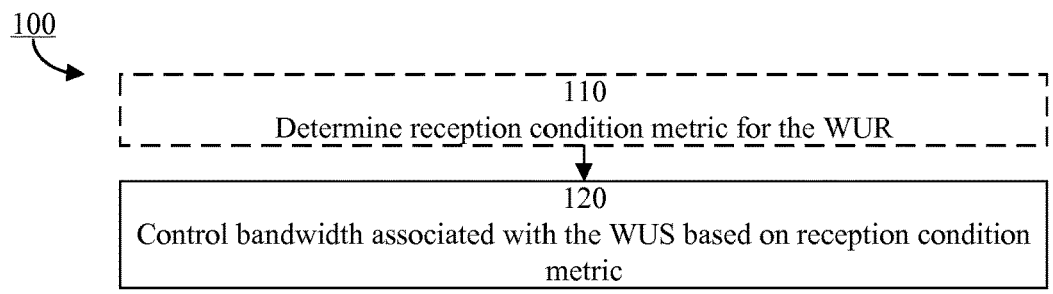
FIG. 1 is flowchart illustrating example method steps according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a bandwidth associated with the WUS is controlled based on a reception condition metric for the WUR. Some general embodiments will be described to start with. Thereafter, example embodiments will be described with reference to the drawings. It should be understood that a feature described in connection to one embodiment (or a group of embodiments) may generally be applicable also to other embodiments, if suitable.

According to some embodiments, a method is provided for a wireless communication apparatus configured to use a WUS transmitted, e.g. by an access point, for waking up a main receiver of a wireless communication device responsive to detection of the WUS by a WUR of the wireless communication device.

According to some embodiments, the wireless communication apparatus may be a sensor or similar less complex device, and another wireless communication apparatus (a wireless communication device or an access point) can transmit a WUS in order to wake up the sensor. Thus, a wireless communication device can act as an "access point node". Throughout the rest of the description, an access point AP in the usual sense is sending the WUS to the wireless communication apparatus but this in not to be construed as limiting, and any device acting as an access point node and transmitting a WUS is equally applicable.

The method comprises controlling a bandwidth associated with the WUS based on a reception condition metric for the WUR. In some embodiments the method may further comprise determining the reception condition metric.

The reception condition metric may be any suitable metric, for example (but not limited to), a received signal strength metric (e.g. RSSI, received signal strength indicator), a path loss, a signal-to-noise ratio (SNR) or similar (e.g. signal-to-interference ratio, SIR). In some embodiments, the reception condition metric may be an extreme (e.g. maximum or minimum) correlation value as will be elaborated on further later herein.

The control of the bandwidth associated with the WUS may, typically, comprise letting a first reception condition value cause the bandwidth to be a first bandwidth and a second reception condition value cause the bandwidth to be a second bandwidth, wherein the first bandwidth is more narrow than the second bandwidth when the first reception condition value indicates more favorable reception conditions than does the second reception condition value.

Favorable and non-favorable reception conditions may be defined via the reception condition metric. For example, a relatively high SIR value may indicate relatively favorable reception conditions and a relatively low SIR value may indicate relatively non-favorable reception conditions. If the correlation value is used, a relatively high maximum correlation value may indicate relatively favorable reception conditions and a relatively low maximum correlation value may indicate relatively non-favorable reception conditions.

The wireless communication apparatus carrying out the method may be the wireless communication device (WCD, e.g. a station (STA) compatible with operation in accordance to IEEE 802.11). Alternatively or additionally, the wireless communication apparatus carrying out the method may be the access point (AP, e.g. compatible with operation in accordance to IEEE 802.11).

In some embodiments, determination of the reception condition metric for the WUR is performed by the WCD. For example, this may be achieved by correlating a received signal comprising the WUS with a WUS reference signal to provide a maximum correlation value, and determining the reception condition metric for the WUR based on the maximum correlation value.

Determining the reception condition metric for the WUR based on the maximum correlation value may, for example, comprise comparing the maximum correlation value to a reception condition threshold value. When the maximum correlation value is higher than the reception condition threshold value it may be determined that the reception condition metric has a first reception condition value. When the maximum correlation value is not higher than the reception condition threshold value it may be determined that the reception condition metric has a second reception condition value.

Here, the first reception condition value indicates more favorable reception conditions than does the second reception condition value. Hence, a narrower bandwidth should be applied in relation to the first reception condition value than in relation to the second reception condition value.

Generally, there may be one or more reception condition thresholds corresponding to two or more intervals of reception condition metric values where a certain bandwidth is to be used for each interval.

Also generally, the reception condition threshold value(s) may be static or dynamic. In a typical example, the reception condition threshold value varies dynamically in relation to a currently applied channel selection filter (CSF) bandwidth of the WUR. A relatively wide CSF bandwidth may be associated with a relatively low reception condition threshold value, and vice versa. Put more generally, the reception condition threshold value may be dynamically adaptable based on an immediately previous bandwidth associated with the WUS.

The detection of the WUS may comprise comparing the maximum correlation value to a WUS detection threshold value which is lower than the reception condition threshold, and waking up the main receiver when the maximum correlation value is larger than the WUS detection threshold value.

According to other embodiments, also a next highest maximum correlation value is considered, i.e. a local maximum value. For example, the synchronization word could be devised such that there is also another peak that is worth considering. Another possibility is to have complementary sequences which basically means that the correlation also will result in one or more negative peaks, i.e. minimum correlation values that may be considered. In other words, some global and local extreme values may be considered for correlation. Similarly to the embodiments described above, one or more reception condition thresholds may be defined, corresponding to two or more intervals of reception condition metric values to be determined using the further or alternative extreme correlation values.

Similarly as for the reception condition threshold value, the WUS detection threshold value may be dynamically adaptable based on an immediately previous bandwidth associated with the WUS. In a typical example, the WUS detection threshold value varies dynamically in relation to a currently applied channel selection filter (CSF) bandwidth of the WUR. A relatively wide CSF bandwidth may be associated with a relatively low reception condition threshold value, and vice versa. Typically, the WUS detection threshold value is lower than the corresponding reception condition threshold value.

Typically, the same correlation process and maximum correlation value is used for both WUS detection and for control of the bandwidth based on the reception condition metric.

As already touched upon, the bandwidth associated with the WUS which is controlled based on the reception condition metric may be either or both of a WUS bandwidth and a filter bandwidth of a channel selection filter (CSF) of the WUR. The CSF may be a bandpass filter or a low pass filter as applicable in the relevant WUR implementation.

When the CSF bandwidth is controlled based on the reception condition metric, such control may, for example, comprise selecting a CSF bandwidth which is substantially equal to the WUS bandwidth in non-favorable reception conditions and selecting a CSF bandwidth which is narrower than the WUS bandwidth in favorable reception conditions.

For example, the CSF may be narrower than the WUS bandwidth by a factor. Such a factor may, in some embodiments, be a number between 1 and 8, for example 2 or 4 or 8. The factor may have different values depending on the reception conditions, such that the more favorable conditions, the larger the value of the factor. In some embodiments, the factor may be related to the symbol rate.

When the WUS bandwidth is controlled based on the reception condition metric, such control may, for example, comprise selecting a relatively wide WUS bandwidth in non-favorable reception conditions and selecting a relatively narrow WUS bandwidth in favorable reception conditions.

Various combinations are also possible. For example, a narrow WUS bandwidth may be used together with a CSF bandwidth that is substantially equal to the WUS bandwidth in very favorable reception conditions, a wide WUS bandwidth may be used together with a CSF bandwidth that is narrower than the WUS bandwidth in average reception conditions, and a wide WUS bandwidth may be used together with a CSF bandwidth that is substantially equal to the WUS bandwidth in non-favorable reception conditions.

When the WUS bandwidth is controlled based on the reception condition metric, the WCD may transmit a signal which is based on the reception condition metric to the access point. The signal may be indicative of the reception condition metric (e.g. may comprise the reception condition metric). Alternatively, the signal which is based on the reception condition metric may be a WUS bandwidth request (e.g. indicative of a WUS bandwidth suitable for the current reception conditions of the WCD).

The signal which is based on the reception condition metric may be transmitted to the transmitter of the WUS, e.g. the access point, at regular time intervals or when some relevant event occurs (e.g. a change of the value of the reception condition metric).

In some embodiments, the WUS bandwidth request may be related to a currently used CSF bandwidth of the WCD. For example, the WUS bandwidth request may indicate a WUS bandwidth which is substantially equal to the currently used CSF bandwidth. In such embodiments, the WUS bandwidth request may be transmitted to the access point when the CSF bandwidth of the WCD is changed.

Generally, a WUS may be directed to a single WUR (unicast) or to a plurality of WUR:s (multicast or broadcast).

In the latter case, the WUS bandwidth may be determined based on the number of WUR:s targeted by a WUS. Typically, more targeted WUR:s may be related to a wider WUS bandwidth, and vice versa. Thus, the number of targeted WUR:s may be seen as a reception condition metric value, where a large number of targeted WUR:s corresponds to non-favorable reception conditions, and vice versa. The reason why the number of targeted WUR:s may be used as a metric is that the reception conditions may be considered to be related to the WUR with the worst conditions as the target is to be able to reach all WURs.

For example, if the number of targeted WUR:s exceeds a WUR quantity threshold value a relatively wide WUS bandwidth may be used and if the number of targeted WUR:s does not exceed the WUR quantity threshold value a relatively narrow WUS bandwidth may be used. The WUR quantity threshold value may, for example, be set to one, such that a narrow bandwidth is used for unicast and a wide bandwidth is used for multicast and broadcast.

Several WUR quantity threshold values may be used to define intervals of WUR quantities, each interval associated with a corresponding WUS bandwidth to be used.

When a WUS is directed to two or more WCD:s and a WUS bandwidth request is received by each of the two or more WCD:s, the widest WUS bandwidth among the WUS bandwidth requests may be selected as the WUS bandwidth.

In some embodiments, a WUS (directed to a single WUR or to a plurality of WUR:s) may be multiplexed in a frequency dimension with other WUS:s. In such embodiments, the WUS bandwidth may be controlled in relation to whether or not the WUS is to be multiplexed, such that a narrow bandwidth is used if the WUS is to be multiplexed. Thus, the number of separate WUS:s to be multiplexed for transmission may be seen as a reception condition metric value, where a large number of separate WUS:s corresponds to favorable reception conditions, and vice versa.

According to one aspect a method and an arrangement are provided for a wireless communication device (WCD). The WCD is configured to use a WUS which has a WUS bandwidth, and which is transmitted by e.g. an access point for waking up a main receiver of the WCD responsive to detection of the WUS by a WUR of the WCD. The WUR comprises a channel selective filter for filtering of the WUS before detection and the method comprises using a channel selective filter bandwidth that is narrower than the WUS bandwidth while the arrangement comprises a controller configured to cause use of a channel selective filter bandwidth that is narrower than the WUS bandwidth.

An arrangement for either or both of a wireless communication device and an access point is also provided. The apparatus comprising the arrangement is configured to use a WUS transmitted by an access point for waking up a main receiver of a wireless communication device responsive to detection of the WUS by a WUR of the wireless communication device.

In some embodiments, the arrangement comprises a controller (e.g. control circuitry) configured to cause execution of the method as described above.

In some embodiments, the arrangement comprises (alternatively or additionally to the controller) bandwidth control circuitry (e.g. a bandwidth controller or a bandwidth control module) configured to control of a bandwidth associated with the WUS based on a reception condition metric of the WUR as has been described above.

In some embodiments, the arrangement comprises (alternatively or additionally to the controller) determination circuitry (e.g. a determiner or a determination module) configured to determine the reception condition metric of the WUR as has been described above.

FIG. 1 schematically illustrates an example method 100 according to some embodiments. The method may be for a wireless communication apparatus (WCD or AP) configured to use a WUS transmitted by an access point for waking up a main receiver of a wireless communication device responsive to detection of the WUS by a WUR of the wireless communication device.

The method starts in optional step 110, where a reception condition metric for the WUR is determined. In step 120, a bandwidth associated with the WUS is controlled based on the reception condition metric for the WUR as explained herein.

Figure 2:
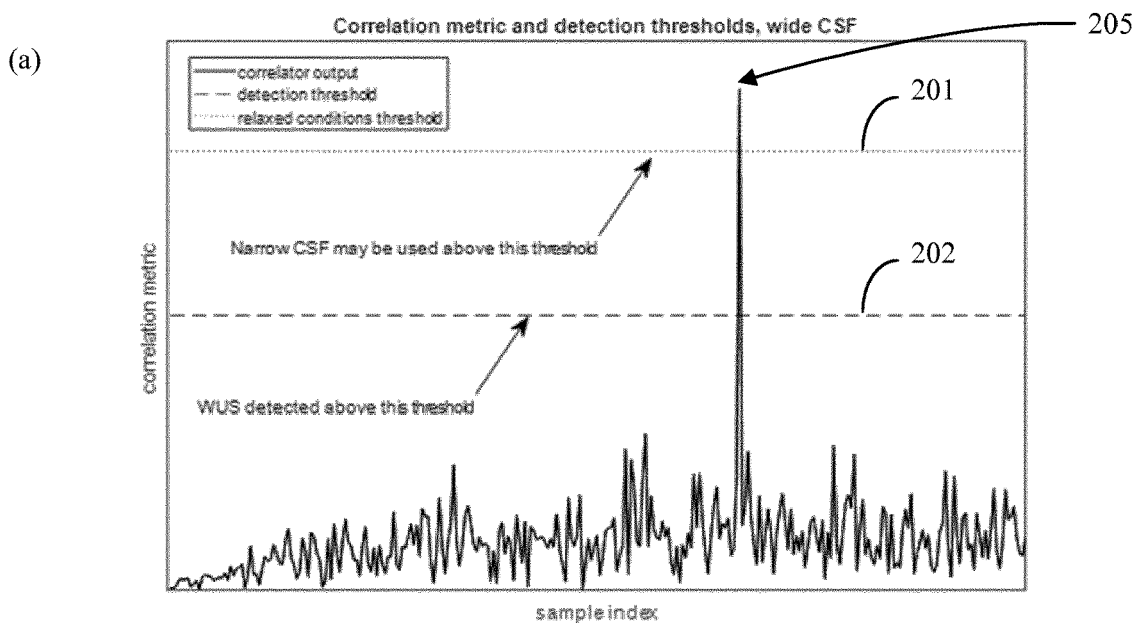
FIG. 2, parts (a) and (b), are plots illustrating example correlation values and threshold values according to some embodiments.
Figure 2:
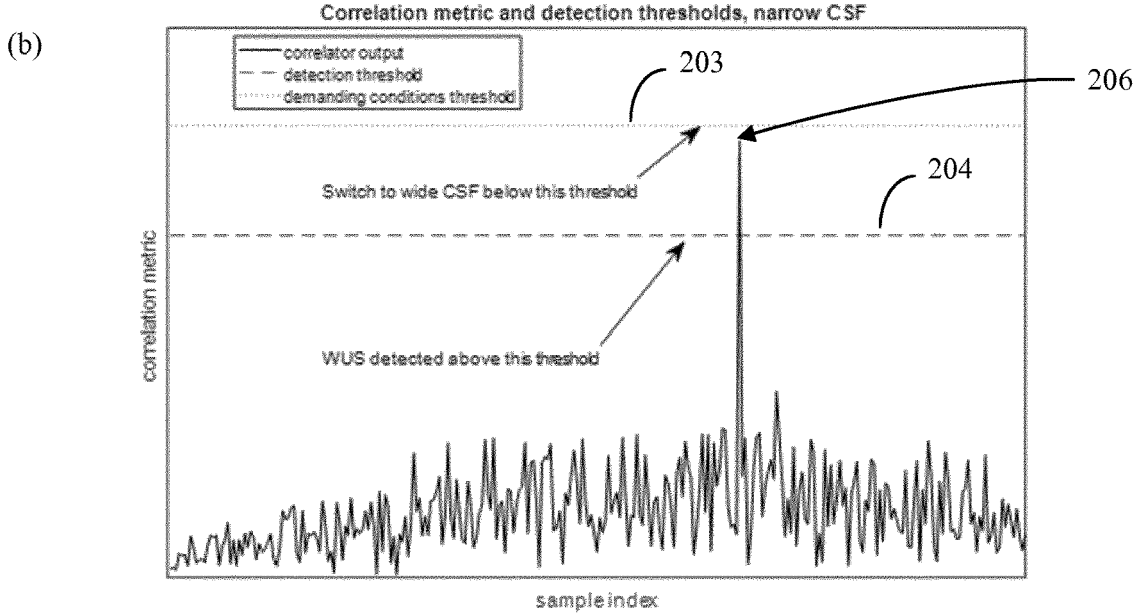

FIG. 2 are plots illustrating example correlation values (correlator output, correlator metric), including maximum correlation values 205, 206. The plots also illustrate example WUS detection threshold values (detection threshold) 202, 204 and example reception condition threshold values (relaxed/demanding conditions threshold) 201, 203.

Part (a) exemplifies a situation where a wide CSF is used and part (b) exemplifies a situation where a narrow CSF is used. As mentioned above, the WUS detection threshold values 202 and 204 are typically different since different CSF bandwidths are used in the two situations. The same applies to the reception condition threshold values 201 and 203

In part (a), when the maximum correlation value 205 is above the WUS detection threshold 202 the WUS is detected.

Furthermore, when the maximum correlation value 205 is also above the reception condition threshold 201, it may be assumed that the reception conditions are favorable (relaxed). The CSF may be switched to a narrow bandwidth to lower power consumption and/or a request for narrow WUS bandwidth may be transmitted.

However, when the maximum correlation value 205 is above the WUS detection threshold 202 but below the reception condition threshold 201, it may be assumed that the reception conditions are non-favorable (demanding) and the CSF may continue to be based on the wide bandwidth.

In part (b), when the maximum correlation value 206 is above the WUS detection threshold 204 the WUS is detected.

Furthermore, when the maximum correlation value 206 is also above the reception condition threshold 203, it may be assumed that the reception conditions are favorable (relaxed) and the CSF may continue to be based on the narrow bandwidth to keep power consumption at a low level.

However, when the maximum correlation value 206 is above the WUS detection threshold 204 but below the reception condition threshold 203, it may be assumed that the reception conditions are non-favorable (demanding). The CSF may be switched to a wide bandwidth and/or a request for wide WUS bandwidth may be transmitted.

Figure 3:
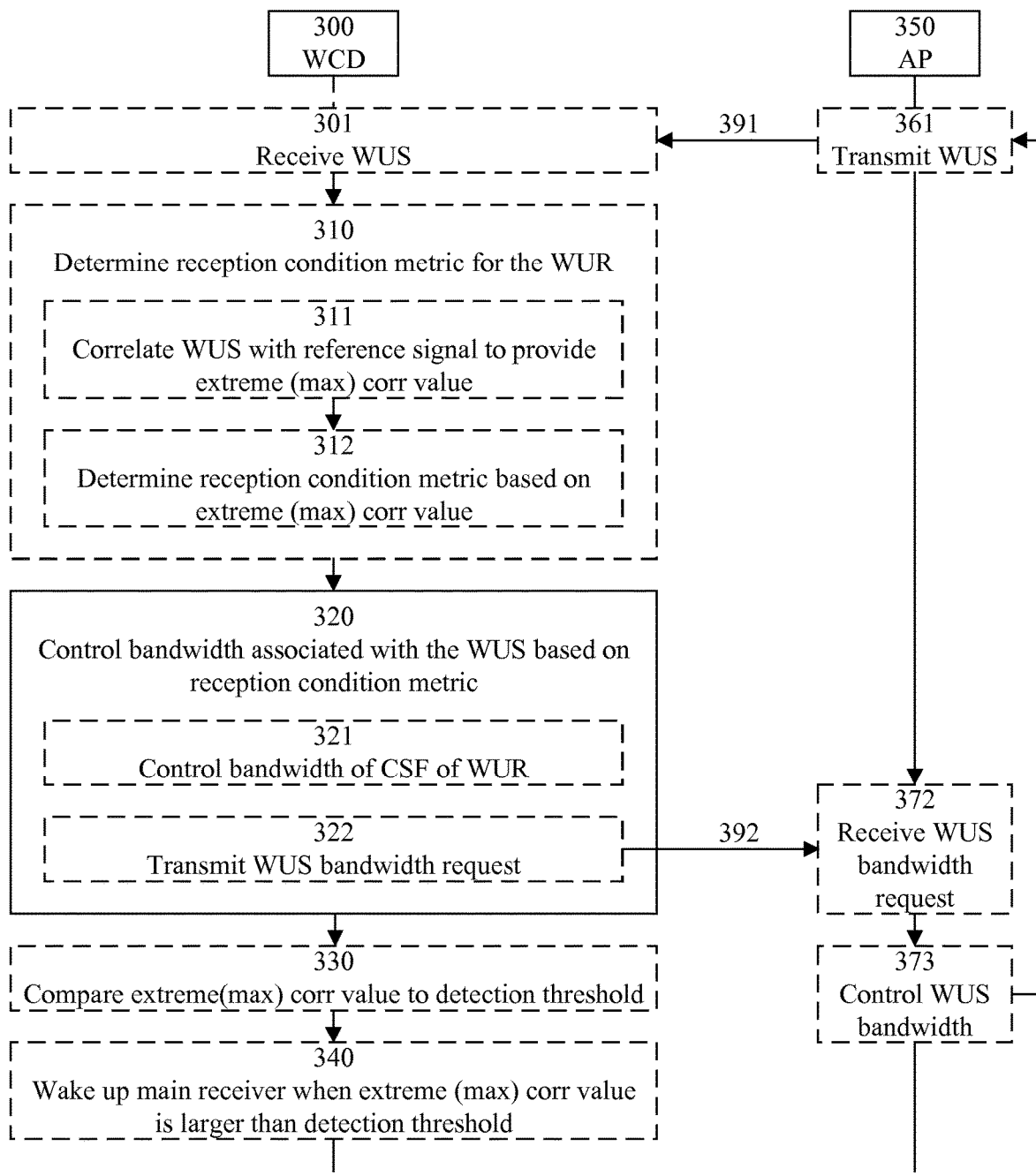
FIG. 3 is a combined flowchart and signaling diagram illustrating example method steps and signaling according to some embodiments.
Figure 4:
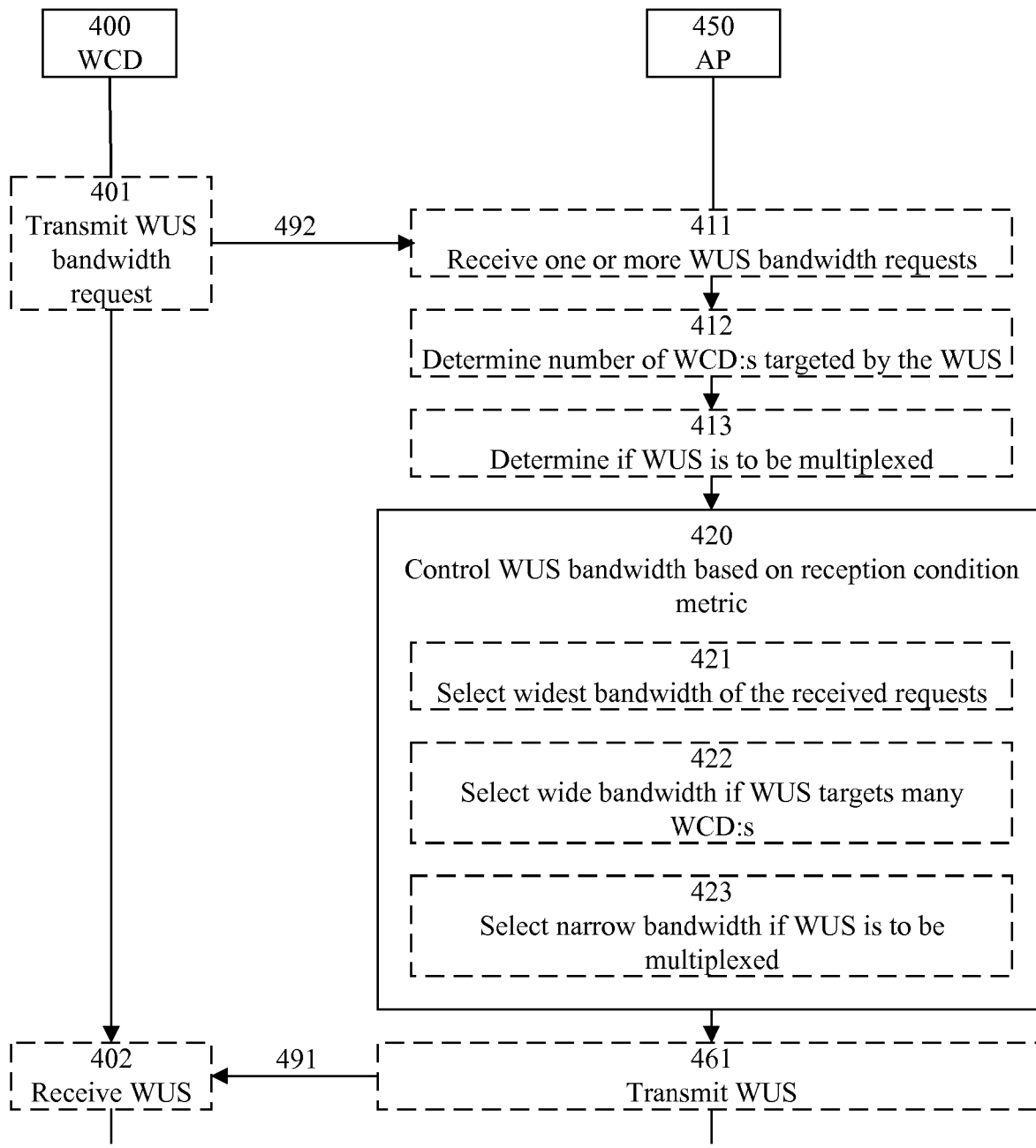
FIG. 4 is a combined flowchart and signaling diagram illustrating example method steps and signaling according to some embodiments.

FIGS. 3 and 4 are combined flowcharts and signaling diagrams illustrating example method steps and signaling when the wireless communication apparatus referred to in connection with FIG. 1 is a WCD (FIG. 3) and an AP (FIG. 4) and the extreme values are maximum correlation values.

In FIG. 3, an AP 350 transmits a WUS 391 in step 361 and the WUS is received by the WCD 300 in step 301.

In step 310, the WCD determines the reception condition metric for the WUR by correlating the received signal comprising the WUS with a WUS reference signal to provide a maximum correlation value (illustrated by sub-step 311) and determining the reception condition metric for the WUR based on the maximum correlation value (illustrated by sub-step 312). For example, sub-step 312 may comprise comparing the maximum correlation value to a reception condition threshold value and determining the reception condition metric to have a first or second reception condition value depending on whether or not the maximum correlation value is higher than the reception condition threshold value (compare with the procedure described in connection to FIG. 2, for example).

In step 320, the WCD controls a bandwidth associated with the WUS based on the reception condition metric. The bandwidth associated with the WUS may be the bandwidth of a CSF of the WUR (illustrated by sub-step 321) and/or may be a WUS bandwidth. In the latter case, the WCD may transmit a WUS bandwidth request 392 to the AP as illustrated by sub-step 322. The WUS bandwidth request is received by the AP in step 372 and the AP may control the WUS bandwidth of an upcoming WUS transmission based on the received request (illustrated by step 373).

The WCD may also compare the maximum correlation value to a WUS detection threshold value (illustrated by step 330) and wake up the main receiver when the maximum correlation value is larger than the WUS detection threshold value (illustrated by step 340). Even though steps 330 and 340 have been illustrated in FIG. 3 to be performed after steps 310 and 320, these steps may be performed in any order or partly or fully in parallel, as applicable. For example, steps 330 and 340 may be performed after sub-step 311 and before or in parallel to (sub-)steps 312 and 320.

In FIG. 4, a WCD 400 transmits a WUS bandwidth request 492 in step 401 and the WUS bandwidth request is received by the AP 450 in step 411. Alternatively or additionally, the AP 450 may determine the number of WCD:s targeted by a WUS to be transmitted as illustrated by step 412. Yet alternatively or additionally, the AP 450 may determine if the WUS to be transmitted is to be multiplexed in a frequency domain as illustrated by step 413.

In step 420, the AP controls a bandwidth associated with the WUS based on the reception condition metric. The bandwidth associated with the WUS may be a WUS bandwidth as indicated in step 420. Numerous variations of the determination of step 420 may be envisioned and a few examples are given in the following.

If a single WCD is targeted by a WUS and a WUS request has been received from that WCD, the AP may select the WUS bandwidth requested. If several WCD:s are targeted by a WUS, the AP may select the widest possible WUS bandwidth to accommodate different conditions for the different WCD:s (illustrated by sub-step 422). If several WCD:s are targeted by a WUS and a WUS request has been received from the WCD:s, the AP may select the widest WUS bandwidth among those requested (illustrated by sub-step 421). If the WUS is to be multiplexed before transmission, the AP may select a narrow bandwidth to enable the multiplexing (illustrated by sub-step 423).

After the control of the WUS bandwidth in step 420, the WUS 491 is transmitted accordingly in step 461 and received by the WCD in step 402.

Figure 5:
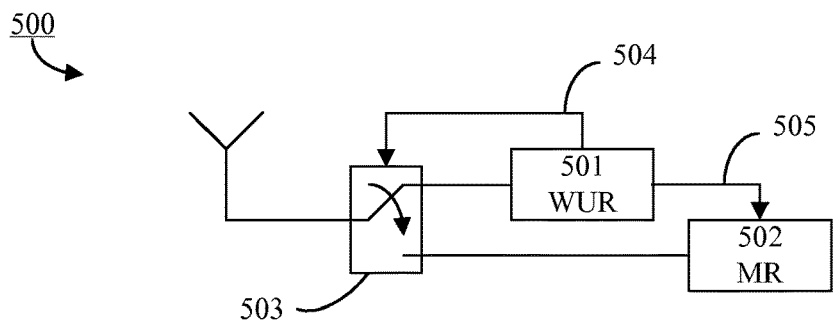
FIG. 5 is a schematic block diagram illustrating an example arrangement comprising a WUR according to some embodiments.

FIG. 5 schematically illustrates an example arrangement 500 comprising a WUR 501 and a main receiver (MR) 501.

In a low power mode, the main receiver 502 is turned off (or set to sleep mode, or similar) and the switch 503 is set to the position shown in FIG. 5. When the WUR detects a WUS, it causes a change of the position of the switch (illustrated by control signal 504) and a wake-up of the main receiver (illustrated by control signal 505).

It should be understood that other implementations using a WUR may be equally applicable in the context presented herein, and that the structure of FIG. 5 is merely provided as an example. For example, the switch 503 may be replaced by circuitry providing a similar function or there may be one antenna for the WUR and one for the main receiver (rendering the switch unnecessary).

Figure 6:
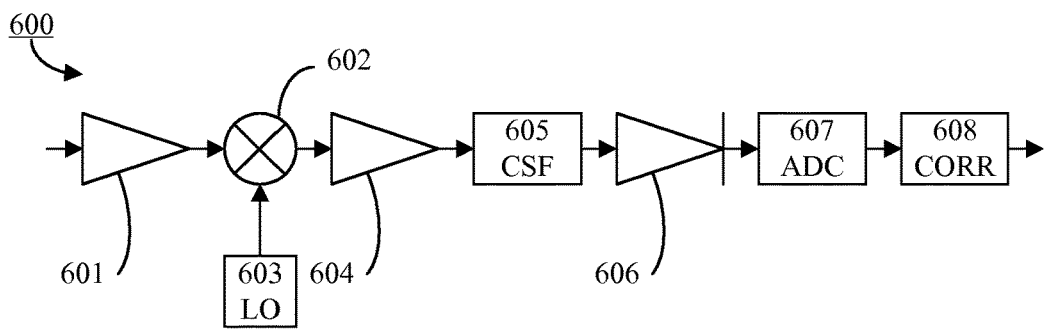
FIG. 6 is a schematic diagram illustrating an example WUR reception chain according to some embodiments.

FIG. 6 schematically illustrates an example WUR reception chain 600 according to some embodiments. The WUR reception chain comprises a low noise amplifier (LNA) 601 and a mixer 602 for mixing the output of the LNA with a local oscillator (LO) signal 603. The output of the mixer is provided to a channel selection filter (CSF) 605 after having passed a further amplifier 604, and the filtered signal is input to an envelope detector 606. At the output of the envelope detector, there is provided an analog-to-digital converter (ADC) 607 and a correlator (CORR) 608.

Figure 7:
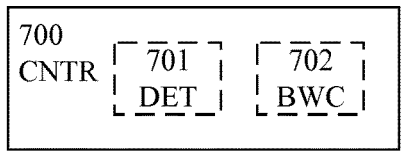
FIGS. 7-9 are schematic block diagrams illustrating example arrangements according to some embodiments.
Figure 9:
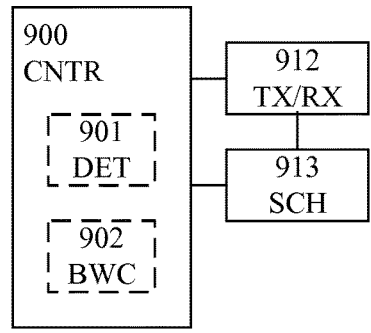
Figure 8:
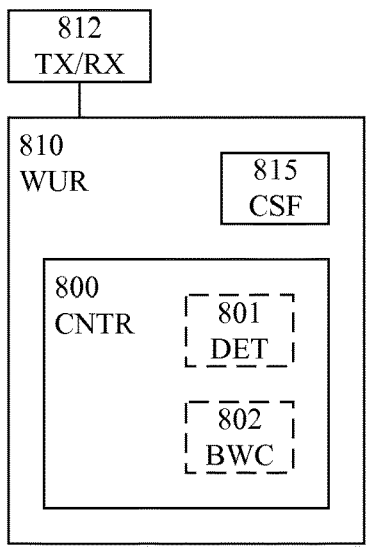

FIGS. 7-9 are schematic block diagrams illustrating example arrangements according to some embodiments as described herein.

FIG. 7 is a generic arrangement comprising a controller (CNTR; control circuitry or control module) 700 for a wireless communication apparatus. The controller may be adapted to cause execution of any of the methods described herein, for example, the methods of any of FIGS. 1, 3 and 4. The arrangement of FIG. 7 may comprise a determiner (DET; determination circuitry or determination module) 701 for determining the reception condition metric and/or a bandwidth controller (BWC; bandwidth control circuitry or bandwidth control module) 702 for controlling the bandwidth associated with the WUS based on the reception condition metric. The determiner and/or the bandwidth controller may be comprised in, or otherwise associated with, the controller 700.

FIG. 8 is an arrangement for a WCD comprising a controller (CNTR; control circuitry or control module) 800. The controller may be adapted to cause execution of any of the methods described herein for WCD:s, for example, the methods of any of FIGS. 1 and 3. The arrangement of FIG. 8 may comprise a determiner (DET; determination circuitry or determination module) 801 for determining the reception condition metric and/or a bandwidth controller (BWC; bandwidth control circuitry or bandwidth control module) 802 for controlling the bandwidth associated with the WUS based on the reception condition metric. The determiner and/or the bandwidth controller may be comprised in, or otherwise associated with, the controller 800. The arrangement may also comprise a WUR 810 having a CSF 815. The controller 800 may be comprised in, or otherwise associated with, the WUR 810. The arrangement may also comprise a transceiver (TX/RX; transceiving circuitry or transceiving module) 812 for transmission of a WUS bandwidth request. The transceiver 812 may, for example, be the main receiver.

FIG. 9 is an arrangement for an AP comprising a controller (CNTR; control circuitry or control module) 900. The controller may be adapted to cause execution of any of the methods described herein for AP:s, for example, the methods of any of FIGS. 1 and 4. The arrangement of FIG. 9 may comprise a determiner (DET; determination circuitry or determination module) 901 for determining the reception condition metric and/or a bandwidth controller (BWC; bandwidth control circuitry or bandwidth control module) 902 for controlling the bandwidth associated with the WUS based on the reception condition metric. The determiner and/or the bandwidth controller may be comprised in, or otherwise associated with, the controller 900. The arrangement may also comprise a scheduler (SCH; scheduling circuitry or scheduling module) 913 for allocating transmission resources to the WUS (which transmission resources are based on the WUS bandwidth). The arrangement may also comprise a transceiver (TX/RX; transceiving circuitry or transceiving module) 912 for transmission of the WUS.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or an access point.

Embodiments may appear within an electronic apparatus (such as a wireless communication device or an access point) comprising arrangements, circuitry, and/or logic according to any of the embodiments described herein. Alternatively or additionally, an electronic apparatus (such as a wireless communication device or an access point) may be configured to perform methods according to any of the embodiments described herein.

Figure 10:
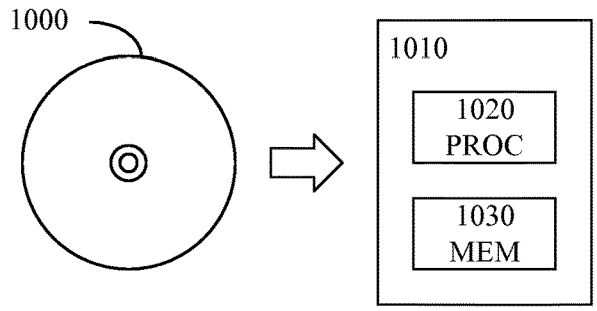
FIG. 10 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC) 1020, which may, for example, be comprised in a wireless communication device or an access point 1010. When loaded into the data processing unit, the computer program may be stored in a memory (MEM) 1030 associated with or comprised in the data-processing unit. According to some embodiments, the computer program may, when loaded into and run by the data processing unit, cause execution of method steps according to, for example, any of the methods illustrated in FIGS. 1, 3 and 4.

Thus, to achieve low power consumption in the WUR, it is desirable to use a channel selective filter with a relatively small bandwidth (and also of low order if possible). Generally, a filter with relatively narrow bandwidth is easier realized as a low order filter than is a filter with relatively wide bandwidth, if the same or similar attenuation is to be achieved outside the signal bandwidth of the WUS. In some scenarios, the power consumption may be proportional to the order of the filter. Thus, lowering the power consumption of the WUR, may be achieved by using a relatively narrow filter bandwidth which enables use of a relatively low order implementation. For example, if adjacent channel interference is to be suppressed (say at a distance of 10 MHz), then a 2 MHz filter may be implemented as having a lower order than a 8 MHz filter. However, also in case the same order filters would be applied, which may simplify switching between different bandwidths, it may be advantageous from a power consumption perspective to use a filter of narrower bandwidth.

On the other hand, due to regulatory requirements the maximum transmission power that can be used is often limited by the power spectrum density (PSD). This limitation means that, although a high total transmission power may be allowed, it cannot be used if the bandwidth of the signal is too small.

Since a reduced transmission power means that the range of the WUS will be reduced, the above results in a trade-off between receiver power consumption and transmission range. Therefore, some embodiments provide a method and an apparatus for flexible signaling and/or reception of a WUS. This will now be even further exemplified.

The bandwidth of the transmitted WUS can be adapted based on range requirements such that a wider signal bandwidth may be used when the requirements are harder, i.e., the path loss from the transmitter to the WUR is higher. Alternatively or additionally, a wider bandwidth may be used for the WUS whether needed or not, and the WUR can autonomously decide what bandwidth to use in a CSF in order to minimize its power consumption. The latter is particularly suitable when the WUS is intended for two or more WUR:s, i.e., when the WUS is a multicast or broadcast message.

Of course, the specific system with its specific parameters used herein to exemplify various embodiments is not meant as limiting to. As obvious to those with skill in the art, the examples presented herein are easily adopted to other systems with potentially very different parameters. Suppose that the considered system is based on IEEE 802.11, and suppose that the channel bandwidth used is 20 MHz. Assuming now that the wake-up signal used for the WUR is 4 MHz and comparing this with the transmission of the regular 802.11 transmission it can be seen that there is a significant penalty in terms of the allowed transmission power that can be used for the wake-up signal. This is described in detail in S. Shellhammer and B. Tian, "Regulations and noise figure—Impact on SNR", IEEE 802.11-17/0365r0, and some key points are just repeated here. For the 2.4 GHz band, the European regulations limits the maximum transmission power of the 4 MHz WUS to be 16 dBm based on the power spectrum density limit of 10 dBm/MHz, whereas at the same time the regular IEEE 802.11 transmission may be 20 dBm. In the 5 GHz band the corresponding difference in maximum allowed transmission power will be 7 dB in Europe, US, and China.

Taking into account that the WUR is assumed to be very power efficient, it is (in Shellhammer and Tian, "Data Rates and Coding", IEEE 802.11-17/0670r0) argued that it can be expected that the noise figure (NF) for the WUR is about 8 dB higher than for the regular receiver. Consequently, considering the link-budget for the WUR and the regular transceiver, there may be as much as 15 dB difference between the two systems.

To understand some embodiments more easily, it is helpful to consider a rather generic WUR architecture as illustrated in FIG. 6. The received signal is amplified in a low noise amplifier (LNA) 601 and then down-converted by the mixer 602 from the radio frequency (e.g. around 2.4 GHz) to—for example—an intermediate frequency (IF) at, say, 10 MHz. The IF signal may then be further amplified in 604 and filtered through a channel selection filter (here; a bandpass filter—BPF—centered around IF). In a standard receiver, the bandwidth of the BPF is approximately equal to the bandwidth of the desired signal such that potentially interfering signals in adjacent channels are attenuated by the BPF. However, to allow for a bandwidth of the BPF that is roughly the same as the bandwidth of the desired signal, is required that the frequency generated by the local-oscillator (LO) is very accurate, because otherwise there is a risk that a non-negligible part of the energy of the WUS will be filtered out, which negatively impacts the performance of the WUR. Embodiments presented herein are applicable irrespectively of whether the bandwidth of the BPF is matched to the bandwidth of the WUS or if a BPF of much larger bandwidth is used.

As will be seen, there is a substantial gain in either case, although the gain decreases the narrower the BPF can be made. Using a wider signal gives a gain because you can use higher transmit (TX) power. If the BPF is not changed the gain is identical to the increase in TX power. If a narrower filter is used for a narrower signal, this improves the performance for the narrow signal since the noise power that enters the detector will be reduced. However, in the context with an envelope detector herein, it turns out that reducing the filter bandwidth does not fully compensate for the increased TX power. The gain is decreased if using a large TX bandwidth, but there is still a gain.

After the BPF 605 of FIG. 6, the signal is demodulated using an envelope detector 606, converted to a digital stream by means of an analog-to-digital converter (ADC) 607, and then processed digitally. Typically, the digital processing involves e.g. time estimation by means of correlation of the received signal with a known synchronization sequence in a correlator 608.

Although the architecture illustrated in FIG. 6 is largely operating in the analog domain, e.g. the envelope detector is before the ADC, it is possible to instead perform a larger part of the receiver processing in the digital domain. For example, additional filtering and the envelope detector may be implemented in the digital domain according to some embodiments.

One reason for selecting a relatively narrow bandwidth for the BPF is that it may allow for lower power consumption, which is typically one of the key parameters for a WUR. Another reason for selecting a relatively narrow bandwidth of the WUS is that it can easily fit in a 20 MHz channel and can be more easily protected from interference from adjacent 20 MHz channels since the BPF will have a narrow passband and consequently a large frequency distance to the adjacent channel.

When selecting the bandwidth of a transmitted signal, this is typically based on what data rate is to be supported. The higher the data rate, the wider the bandwidth. In case of a WUS, this is not the case. An attractive means to generate the WUS was presented in M. Park et al. "Low-power wake-up receiver (LP-WUR) for 802.11," IEEE 802.11-15/1307r1. An attractive modulation to be used for the WUS in on-off keying (OOK) as this allows for a very simple receiver based on an envelope detector (compare with FIG. 6). In Park et al., it was proposed to generate the OOK signal by using the same inverse fast Fourier transform (IFFT) block as is used for transmitting the regular IEEE 802.11 signal. ON was then represented by populating 13 sub-carriers by some signal, whereas OFF was represented by not sending anything. The IFFT block is using a 64 point FFT and is clocked at 20 MHz, which results in that the transmitted signal (in case of ON) will have a bandwidth of approximately 13×312.5 kHz=4 MHz, since the sub-carrier spacing in 20 MHz/64=312.5 kHz.

Since the WUS is generated using a 64 point FFT at 20 MHz sampling frequency, the duration of one OFDM symbol is 3.2 µs. If a cyclic prefix (CP) of 0.8 µs is added, which is commonplace in IEEE 802.11, the total duration of an OFDM symbol including the CP is 4 µs and the corresponding symbol rate thus becomes 250 ksymbols/s (equivalent to 250 kb/s for WUS). If the WUS is generated using 52 sub-carriers instead, i.e., four times more carriers, the symbol rate remains the same, i.e., 250 ksymbols/s (equivalent to 250 kb/s for WUS).

A comparison may be made of how the performance of a WUR depends on the bandwidth of the WUS. The working procedure of the receiver in FIG. 6 is actually independent of the bandwidth of the signal, the only (possible) exception being the CSF 605 in front of the envelope detector.

Figure 11:
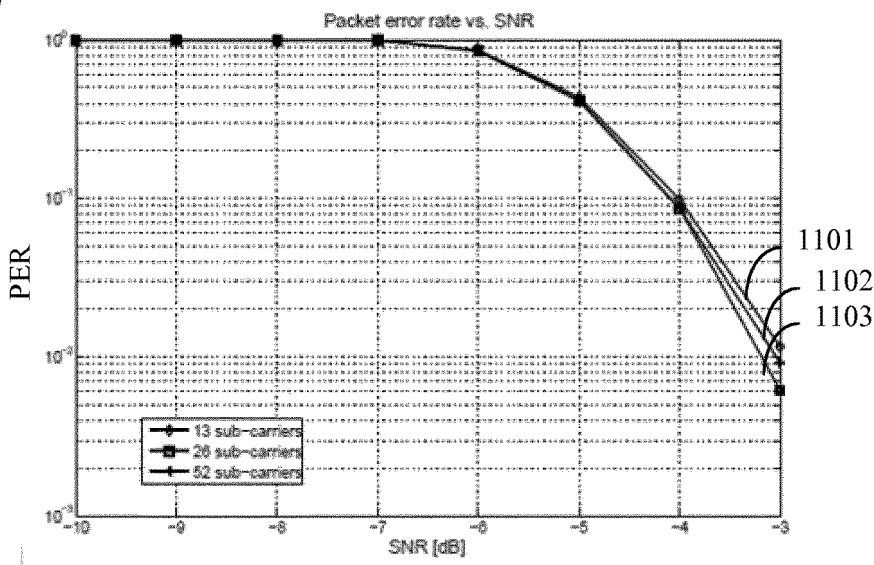
FIG. 11, parts (a), (b) and (c), are plots illustrating example packet error rates (PER) as functions of signal-to-noise ratio (SNR) according to some embodiments.
Figure 11:
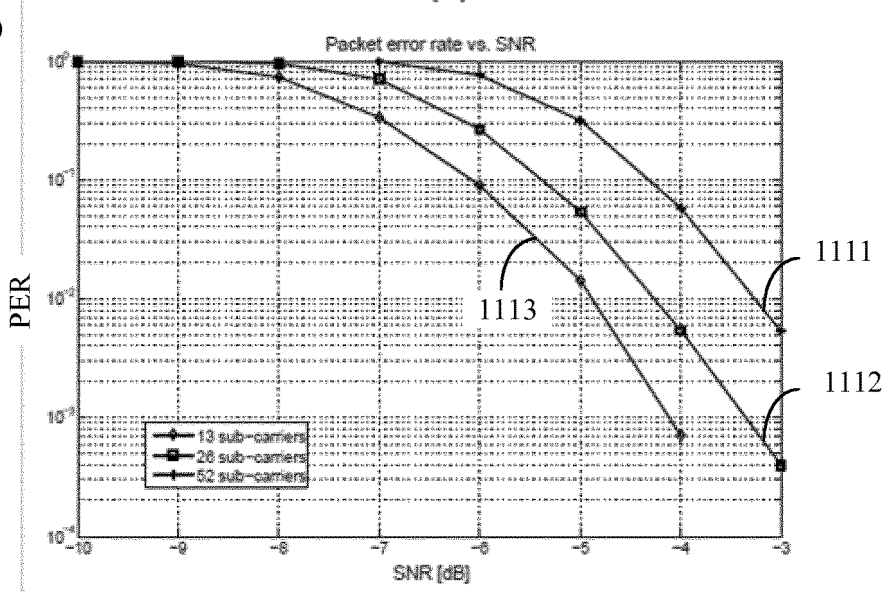
Figure 11:
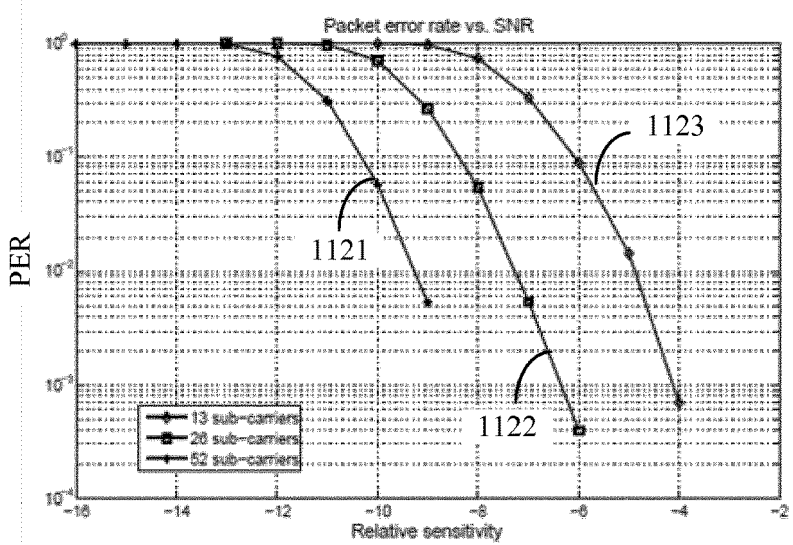

FIG. 11 illustrates resulting packet error rates (PER) of some simulations performed to evaluate the impact of the bandwidth of the WUS. The WUS is generated using a 64 point FFT and adding a CP as described above. Manchester coding is applied, i.e., a logical zero is represented by transmitting one symbol being OFF followed by one symbol being ON, whereas a logical one is represented by transmitting one symbol being ON followed by one symbol being OFF. The use of Manchester coding reduced the effective data rate to 125 kb/s. This will improve the performance in terms of sensitivity, but the main reason for applying Manchester coding, however, is that it considerably simplify the demodulation of the signal. Specifically, if plain OOK is employed, a decision threshold needs to be estimated which is to be used to decide whether the received signal corresponds to ON or OFF. With Manchester coding, there is no need for a threshold, but instead the decision is based on comparing the first symbol with the last, and deciding in favor of a logical zero if the first OOK symbol contains less energy than the second and decide in favor of a logical one if the first OOK symbol contains more energy than the second one.

The simulated performance when no (or a very wide) BPF is used is depicted in part (a) of FIG. 11. The SNR is defined as the power of the desired signal divided by the power of the noise after the mixer and before the CSF. As can be seen the performance of the WUR is basically independent of the bandwidth of the WUS in this case. The reason for not having a CSF at all, or using a CSF with a bandwidth that is much larger than the bandwidth of the actual WUS, is that it allows for a very relaxed implementation of the frequency generation circuitry (LO).

Since the required SNR is the same irrespective of the bandwidth of the WUS, but the allowed transmission power is proportional to the used bandwidth, the path loss that can be handled in case a larger bandwidth is used will be correspondingly increased. As a simple example to appreciate this, consider a link budget calculation where the maximum path loss, PL, that can be accepted is given by (in dB):

$$PL=P_{TX}-RX_{sens}[dB],$$

where $RX_{sens}$ is the sensitivity of the WUR and $P_{TX}$ is the transmission power. $RX_{sens}$ can then be calculated as:

$$RX_{sens}=kTB+NF+SNR=-101+15+(-3)=-89dBm.$$

Here, kTB is the thermal noise floor calculated for a bandwidth of 20 MHz, NF is the noise figure which is assumed to be 15 dB (following Shellhammer and Tian this is assumed a reasonable value taken to be 8 dB higher than for the regular IEEE 802.11 receiver), and −3 dB is the required SNR to obtain a frame error rate of less than 10%, which is obtained from FIG. 11, part (a).

Next, to relate this to coverage, the path loss, e.g. at 5.5 GHz, is modelled as function of the distance, d, as follows $$PL=47+3.5 \log_{10}d[dB].$$

Here, the term 47 corresponds to free space path loss for 1 meter at 5.5. GHz, and the distance d is in meters. The factor 3.5 is often used to model how the path loss depends on distance ($d^{3.5}$). In the case of free space, 2.0 might be used instead. From Shellhammer and Tian we obtain that the maximum transmission power is limited by the PSD to 10 dBm/MHz in 5 GHz.

For the two WUS signals using 13 and 52 sub-carriers, respectively, the maximum transmission power therefore becomes 16 and 22 dBm, respectively. This, in turn, corresponds to a maximum path loss of 16−(−89)=105 dB and 22−(−89)=111 dB, respectively. Converting this to coverage, it is readily calculated that the corresponding range is 45 and 67 meters, i.e., by increasing the bandwidth of the WUS the range has been increased by roughly 50%. Similar derivations can be made for the 2.4 GHz band and others.

In case one would find it beneficial to implement a CSF with a bandwidth corresponding to the bandwidth of the WUS, the sensitivity performance will be somewhat improved. In FIG. 11, part (b), the corresponding simulated performance is shown, but now with a CSF with a bandwidth that is the same as the signal bandwidth of the WUS. As can be seen, the performance is improved for the signal with the smaller bandwidth to some extent. Specifically the 4 MHz signal (13 sub-carriers) now has a required SNR of about −6 dB, whereas the 16 MHz signal (52 sub-carriers) has a required sensitivity of about −4 dB, implying at 2 dB gain for the narrower signal.

The conclusion is that although the SNR at the input to the envelope detector can be greatly improved, it does not improve the overall performance correspondingly. The reason for this is the low pass filter (LPF) which is part of the envelope detector. Although the wideband noise is input to the nonlinear envelope detector, the LPF still suppress the high frequency components to a large extent.

Part (c) of FIG. 11 illustrates the curves of part (b) but where the SNR has been normalized to illustrate dependency on relative sensitivity. That is, in part (c) the sensitivity performance curves shown in (b) have been scaled taking the maximum allowed transmission power into account. Specifically, assuming that the allowed transmission power is PSD limited, a signal with twice the bandwidth is shifted 3 dB to the left. Taking curves 1111 and 1113 in Part (b) as examples, the receiver performance is about 2 dB better for the narrower signal (1113 which corresponds to a WUS bandwidth of 4 MHz) than for the wider signal (1111 which corresponds to a WUS bandwidth of 16 MHz). However, since the 16 MHz signal is four times wider than the 4 MHz signal, it can be transmitted at 6 dB higher power yielding an advantage of 4 dB (i.e. 6−2 dB) in terms of link budget. This gain of 4 dB is illustrated by shifting the curve 1111 in part (b) 6 dB to the left for part (c), resulting in the shifted version denoted 1121.

With reference to FIG. 11, a further example of how the CSF bandwidth may be selected in relation to the WUS bandwidth may be given. In the simulations, The bandwidth of the WUS can be 4, 8 or 16 MHz (corresponding to 13, 26 or 52 sub-carriers). The different bandwidths of the CSF can then be selected to be e.g. 4, 8 and 16 MHz. An example where the bandwidth of the CSF is considerably smaller than the WUS bandwidth would be when the CSF bandwidth is 4 MHz and the WUS bandwidth is 16 MHz, i.e. the factor referred to above would equal 4.

Although the derivations have been based on a superheterodyne receiver and band-pass filter (FIG. 6), the principles are equally applicable to a homodyne (zero-IF) receiver with low-pass filters. Also, low-IF receivers with low-pass filters or complex band-pass filters can be used to realize the concept.

Example 1: WUR with Varying Receiver Filter Bandwidth

A WUR receiver is disclosed characterized by that the bandwidth of the channel selective filter can be varied such that a narrower filter may be used when the receiver conditions are less demanding whereas a wider filter may be used when the receiver conditions are more demanding. For example, a demanding condition occurs when the WUR is located at the edge of the coverage area. The WUR can determine whether it is in a demanding condition by means of a correlation metric obtained from the cross-correlation of the received signal with a reference signal. An illustration is given in FIG. 2, part (a), where the correlation metric is shown, together with two thresholds. In this figure the WUR uses a wide CSF. A first threshold 202 is used for WUS detection. A second threshold 201, higher than the second, is used to determine whether the conditions are not too demanding and the CSF may be switched to a narrow CSF. Another illustration is given in FIG. 2, part (b). In this case the WUR is using a narrow CSF. A WUS is detected when the correlation metric exceeds a third threshold 204. However, if the correlation metric does not exceed a fourth threshold 203 (larger than the third threshold), then the conditions are demanding and a switch to a wide CSF is indicated.

FIG. 2, part (a) is an illustration of a determination of relaxed conditions at the WUR. In this example, the WUR utilizes a wide CSF. Since the correlation metric 205 exceeds the WUS detection threshold 202, a WUS is detected. Moreover since the correlation metric 205 also exceeds a relaxed conditions threshold 201, the WUR may switch to a narrow CSF in order to decrease power consumption.

FIG. 2, part (b) is an illustration of a determination of demanding conditions at the WUR. In this example, the WUR utilizes a narrow CSF. Since the correlation metric 206 exceeds the WUS detection threshold 204, a WUS is detected. However since the correlation metric 206 does not exceed a demanding conditions threshold 203, the WUR should switch to a wide CSF in order to ensure good receiver performance.

Example 2: Signaling for Request of Signal Bandwidth of the WUS

A method for signaling a request for a WUS bandwidth is disclosed. The method characterized by that the device having a WUR sends a request to the device transmitting the WUS requesting the transmitting device to use a specific bandwidth, out of at least two possible bandwidths, where the requested bandwidth may be the same as is already used, or the bandwidth may be smaller than the bandwidth currently used, or the bandwidth may be larger than the bandwidth currently used.

Example 3: Determination of Signal Bandwidth of the WUS Based on Feedback

The bandwidth to be allocated to the WUS is determined by the transmitter based on feedback from at least one device having a WUR. The determination may be based on feedback from a single device as described in Example 2, or it can be based on taking feedback from two or more devices into account. For example, in case the determination is based on feedback from two or more devices, the decision can be to use the largest of the bandwidth requested by the different devices providing feedback.

Example 4: Determination of Signal Bandwidth of the WUS without Feedback

The bandwidth to be used for specific WUS is determined by the transmitter of the WUS autonomously, i.e., without any feedback from the potential receivers of the WUS.

For example, the bandwidth may be determined based on the type of transmission as follows. If the transmission is for a single WUR a smaller bandwidth may be allocated, whereas if the transmission is intended for two or more WUR:s (i.e., the transmission is a multi-cast or broadcast transmission) a larger bandwidth may be allocated to the WUS. The rationale for this is that whether a transmission intended for a single device is successful is more easily determined than whether a broadcast transmission is correctly received by all targeted WUR:s.

Alternatively or additionally, if two or more WUS are to be multiplexed in frequency, i.e., using frequency division multiplexing (FDM), this may only be possible if a more narrow bandwidth would be used for (each) WUS. Therefore the bandwidth of the WUS may be determined based on whether the transmission of the WUS consists of one WUS, in which case a larger bandwidth may be used, or if the transmission consists of two or more WUS:s, in which case a smaller bandwidth may be used.

Further Exemplifying:

Variable signal bandwidth of WUS for enhanced performance.

Further details regarding this exemplification may be found in the presentation material at https://mentor.ieee.org/802.11/dcn/17/11-17-0662-00-00ba-simulated-wur-performance-in-frequency-selective-channels.pptx.

In Shellhammer and Tian it is high-lighted that a 4 MHz wake-up signal will suffer about 7 dB in allowed TX power, when the limit is set by PSD. From a power consumption point of view, it is beneficial to have smaller bandwidth; however the loss in link budget is huge. One proposition is to allow the wake-up signal to be sent with a suitable bandwidth which can be used to obtain a (preferably optimum) sensitivity-power consumption trade-off. The WUR can select bandwidth of the channel selective filter independent of the signal bandwidth. This approach can be seen as a special case of what was presented in L. Wilhelmsson and M. Lopez, "Concurrent transmission of data and a wake-up signal in 802.11ax," IEEE 802.11-17/0094r1, but without concurrent transmission of data.

A recap of link budget considerations: In Shellhammer and Tian, it is emphasized that a 4 MHz WUS will suffer 4 or 7 dB in allowed TX power due to regulatory requirements (different for different bands). It has also been agreed that it is reasonable to assume that the noise figure is 8 dB higher for the WUR. In addition, it was shown in L. Wilhelmsson, "Simulated WUR performance in frequency selective channels," IEEE 802.11-17/0662r0, that the loss in frequency diversity for a 4 MHz signal compared to a 20 MHz channel easily can be a few dB.

Motivation: To compensate for the relatively small bandwidth, the data rate has to be reduced, leading to increased longer wake-up packets, and to some extent leading to increased complexity (harder synchronization and forward error correction—FEC—decoding). It is proposed to instead increase the bandwidth of the signal when needed. That means a corresponding increase in range, but with no cost in power consumption as the large bandwidth is only used when needed.

Model for receiver processing: See FIG. 6. The envelope detector 606 may comprise a rectifier (as shown) and a low pass filter. The output of the ADC 607 may be input to a correlator 608 and the output of the correlator may be subtracted from the output of the ADC. Then, the result may be down-sampled by 4 based on the correlator result. The ADC runs at 4x oversampling relative WUS symbol rate. The correlator (coefficients +/−1) is operating on signal with DC bias. Manchester coding is used, so no need to estimate the decision threshold DC.

Varying the signal bandwidth: The WUS bandwidth may be varied, for example, between 4 MHz, 8 MHz and 16 MHz. The power of the WUS is boosted by allocating more sub-carriers to the WUS. The smallest BW corresponds to the 13 sub-carriers first proposed in M. Park et al., "Low-power wake-up receiver (LP-WUR) for 802.11," IEEE 802.11-15/1307r1.

Simulated sensitivity as a function of signal bandwidth: Simulation set-up as described in connection with FIG. 11. Performance in AWGN (additive white Gaussian noise) channel without CSF is illustrated in FIG. 11, part (a). If no channel selective filter (CSF) is used, the bandwidth of the signal should not matter in terms of required SNR. There will be a corresponding gain in the link budget due to the increased allowed TX power. Performance in AWGN channel with CSF is illustrated in FIG. 11, parts (b) and (c). With a CSF, a smaller signal bandwidth will also allow for correspondingly less noise at the envelope detector input. The gain is about 1 dB for a 2× increase of the bandwidth. Consequently, as can be seen in FIG. 11, part (c), there is a 2 dB gain in terms of link budget for every 2× increase in bandwidth.

Increasing the (noise) bandwidth of the filter in beneficial conditions is due to the low pass filter (LPF) in the envelope detector. The bandwidth of the LPF is not determined by the signal bandwidth but by the data rate, and is 150 kHz here. The LPF still removes part of the noise power, although the signal is passed through a non-linear component.

WUR implementation aspects and relation to FDM transmission of wake-up signals: Changing the bandwidth of an analog filter (keeping all other parameters the same) is easily done by shifting in/out components. There are no issues related to switching time. If a wideband WUS is used, a WUR with good channel conditions may still use a CSF with a small bandwidth in order to save power. For multicast/broadcast, receivers can decide autonomously what filter bandwidth to use if WUS is transmitted with a large bandwidth. Transmission of several WUS:s may be allowed by means of FDM (e.g. three 4 MHz WUS distributed over a frequency range of 16 MHz). The approaches herein may, potentially, be seen as a generalization of the FDM approach to WUS transmission, with a varying bandwidth.

CSF Implementation Examples:

1) For single user transmissions using the central 4 MHz channel: A $2^{nd}$ order Butterworth filter may be defined. This meets the power budget of 40 µW for the filter, accompanied by ~40 µW of a ring oscillator for which a phase noise model may be provided. This can be used to report performance results for approximately 100-200 µW WUR.

2) For transmissions using the non-central 4 MHz channel: A $5^{th}$ order filter may be defined. The phase noise model may be used again but the noise profile may be obtained from a higher power consuming LO. This combination may be used to evaluate advanced multi-TX features at the expense of higher power consumption.

SOME FURTHER EXAMPLE EMBODIMENTS

1. A wireless terminal (STA) comprising a wake-up receiver (WUR) with an adaptable filter (BPF/CSF), configured to:
   adapt the bandwidth of the filter depending on a metric associated with the reception conditions at the STA (with a view to minimize the power consumption).
2. A wireless terminal as in 1, configured to set the filter to a relatively narrower bandwidth in good reception conditions, and to a relatively wider bandwidth in poor reception conditions.
3. A wireless terminal as in 1 or 2, configured to switch the filter to a narrower bandwidth if the metric falls above a switching threshold, and configured to switch the filter to a wider bandwidth if the metric falls below a switching threshold, wherein the switching thresholds may be the same or different.
4. A wireless terminal as in 1-3, wherein the metric is a correlation metric obtained from the cross-correlation of the received signal with a reference signal.
5. A wireless terminal as in 1-4, configured to set a wake-up signal (WUS) detection threshold in dependence of the current bandwidth of the filter. (Put differently; suppose the wider filter gives better quality of the received signal. Then, maybe the threshold is the same but the wide bandwidth is needed to actually declare the WUS as detected, but the threshold as such is not really changed.)
6. A wireless terminal as in 5, wherein the respective detection thresholds are lower than the respective switching thresholds.
7. A wireless terminal as in 1-6, configured to send a request to an access point (AP) for a desired bandwidth of the wake-up signal.
8. A wireless terminal as in 7, wherein the desired bandwidth of the wake-up signal is depending on the bandwidth of the filter, preferably a bandwidth corresponding to the bandwidth of the filter (thus the sensitivity performance will be somewhat improved).
9. A wireless terminal as in 7-8, configured to send the bandwidth request at a change of the bandwidth of the filter.
10. A wireless terminal (STA) comprising a wake-up receiver (WUR) with an adaptable bandpass filter (BPF/CSF), configured to:
    adapt the bandwidth of the filter depending on a received wake-up signal, the bandwidth corresponding to the bandwidth of the WUS (thus the sensitivity performance will be somewhat improved).
11. An access point (AP) configured to send a wake-up signal to one or more wireless terminals, and further configured to:

adapt the bandwidth of the wake-up signal to signaling conditions between the access point and the wireless terminal.

12. An access point as in 11, configured to use a relatively wider bandwidth and/or relatively higher transmission power (density) at a relatively higher path loss between the access point and the wireless terminal, and to use a relatively narrower bandwidth and/or relatively lower transmission power (density) at a relatively lower path loss between the access point and the wireless terminal.

13. An access point as in 11-12, configured to determine the signaling conditions based on feedback from one or more wireless terminals.

14. An access point as in 13, configured to use the widest bandwidth requested by a wireless terminal.

15. An access point as in 11-14, configured to determine the signaling conditions based on the number of wireless terminals targeted to receive the wake-up signal.

16. An access point as in 15, configured to use a relatively narrower bandwidth if a single wireless terminal is targeted to receive the wake-up signal, and a relatively wider bandwidth if a several wireless terminals are targeted to receive the wake-up signal.

17. An access point as in 11-16, configured to determine the signaling conditions based on the number of separate wake-up signals to be transmitted to one or more wireless terminals.

18. An access point as in 17, configured to use a relatively wider bandwidth if a single wireless terminal is targeted to receive the wake-up signal, and a relatively narrower bandwidth if a several wireless terminals are targeted to receive the wake-up signal to be transmitted using frequency division multiplexing (FDM).

19. An access point as in any one of 11-18, configured to generate the WUS using on-off keying (OOK), and for the relatively narrower bandwidth populating 13 sub-carriers by some signal, and for the relatively wider bandwidth populating 52 sub-carriers by some signal.

20. An access point as in 19, configured to apply Manchester coding.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method for a wireless communication device, the method comprising:

detecting, by a wake-up receiver (WUR) of the wireless communication device, a wake-up signal (WUS) for waking up a main receiver of the wireless communication device;

determining a reception condition metric for the WUR based on detecting the WUS; and controlling a WUS bandwidth based on the reception condition metric for the WUR, wherein:

controlling the WUS bandwidth comprises transmitting, to an access point node, a control signal that is based on the reception condition metric;

the WUS bandwidth comprises a bandwidth of a signal comprising a further WUS that is transmitted by the access point node; and the bandwidth of the signal comprising the further WUS is responsive to the control signal.

2. The method of claim 1, wherein determining the reception condition metric for the WUR comprises:

correlating a received signal comprising the WUS with a WUS reference signal to provide an extreme correlation value; and determining the reception condition metric for the WUR based on the extreme correlation value.

3. The method of claim 2, wherein determining the reception condition metric for the WUR further comprises:

comparing the extreme correlation value to a reception condition threshold value;

determining the reception condition metric to have a first reception condition value when the extreme correlation value is higher than the reception condition threshold value; and determining the reception condition metric to have a second reception condition value when the extreme correlation value is not higher than the reception condition threshold value.

4. The method of claim 3, further comprising dynamically adapting the reception condition threshold value based on an immediately previous bandwidth associated with the WUS.

5. The method of claim 3, further comprising:

comparing the extreme correlation value to a WUS detection threshold value that is lower than the reception condition threshold; and waking up the main receiver when the extreme correlation value is larger than the WUS detection threshold value.

6. The method of claim 1, wherein the control signal is a WUS bandwidth request.

7. A method for an access point node of a wireless network, the method comprising:

receiving, from a wireless communication device, a control signal that is based on a reception condition metric that is determined based on a wake-up receiver (WUR) of the wireless communication device detecting a wake-up signal (WUS) for waking up a main receiver of a wireless communication device; and controlling a bandwidth of a signal comprising a further WUS based on the control signal; and transmitting the signal comprising the further WUS to at least the wireless communication device, wherein the further WUS having the bandwidth according to the controlling.

8. The method of claim 7, wherein the control signal is a first WUS bandwidth request.

9. The method of claim 8, wherein:

the method further comprises receiving, from a second wireless communication device, a second WUS bandwidth request that is based on a second reception condition metric that is determined based on a WUR of the second wireless communication device detecting the WUS; and controlling the bandwidth of the signal comprising the further WUS comprises selecting, as the bandwidth, a maximum of respective bandwidths indicated by the first and second WUS bandwidth requests.

10. A wireless communication device, comprising:

a main receiver and a wake-up receiver (WUR) configured to wake up the main receiver based on detection of a wake-up signal (WUS);

a transmitter; and a controller operably coupled to the transmitter, the main receiver and the WUR, whereby the wireless communication device is configured to:

detect a WUS by the WUR;

determine a reception condition metric for the WUR based on detection of the WUS; and control a WUS bandwidth based on the reception condition metric for the WUR wherein:

the wireless communication device is configured to control the WUS bandwidth based on transmitting, to an access point node, a control signal that is based on the reception condition metric;

the WUS bandwidth comprises a bandwidth of a signal comprising a further WUS that is transmitted by the access point node; and the bandwidth of the signal comprising the further WUS is responsive to the control signal.

11. The wireless communication device of claim 10, wherein the wireless communication device is configured to determine the reception condition metric for the WUR based on:

correlating a received signal comprising the WUS with a WUS reference signal to provide an extreme correlation value; and determining the reception condition metric for the WUR based on the extreme correlation value.

12. The wireless communication device of claim 11, wherein the wireless communication device is further configured to determine the reception condition metric for the WUR based on:

comparing the extreme correlation value to a reception condition threshold value;

determining the reception condition metric to have a first reception condition value when the extreme correlation value is higher than the reception condition threshold value; and determining the reception condition metric to have a second reception condition value when the extreme correlation value is not higher than the reception condition threshold value.

13. The wireless communication device of claim 12, wherein the wireless communication device is further configured to dynamically adapt the reception condition threshold value based on an immediately previous bandwidth associated with the WUS.

14. The wireless communication device of claim 12, wherein the wireless communication device is further configured to:

compare the extreme correlation value to a WUS detection threshold value which is lower than the reception condition threshold; and wake up the main receiver when the extreme correlation value is larger than the WUS detection threshold value.

15. The wireless communication device of claim 10, wherein the control signal is a WUS bandwidth request.

16. An access point node of a wireless network, the access point node comprising:

a transceiver configured to communication with at least one user equipment (UE);

a controller operably coupled to the transceiver, whereby the access point node is configured to perform operations corresponding to the method of claim 7.

* * * * *